US007241841B2

(12) United States Patent
Stere et al.

(10) Patent No.: US 7,241,841 B2
(45) Date of Patent: Jul. 10, 2007

(54) HYDROGENATED COPOLYMERS OF UNSUBSTITUTED AND SUBSTITUTED CONJUGATED DIENES

(75) Inventors: Cristina Stere, Leverkusen (DE); Werner Obrecht, Moers (DE); Udo Sondermann, Dorsten (DE); Gerd Sylvester, Leverkusen (DE)

(73) Assignee: Lanxess Deutschland GmbH, Leverkusen (DE)

( * ) Notice: Subject to any disclaimer, the term of this patent is extended or adjusted under 35 U.S.C. 154(b) by 0 days.

(21) Appl. No.: 11/123,819

(22) Filed: May 6, 2005

(65) Prior Publication Data

US 2005/0261439 A1 Nov. 24, 2005

(30) Foreign Application Priority Data

May 7, 2004 (DE) .................. 10 2004 022 676

(51) Int. Cl.
C08C 19/02 (2006.01)
C08F 8/02 (2006.01)

(52) U.S. Cl. ............... 525/338; 525/333.1; 525/333.2; 526/335; 526/336

(58) Field of Classification Search ............... 525/338, 525/333.1, 333.2; 526/335, 336
See application file for complete search history.

(56) References Cited

U.S. PATENT DOCUMENTS

| 323,635 | A | 8/1885 | Chapin |
| 498,033 | A | 5/1893 | Scott |
| 3,135,716 | A | 6/1964 | Uraneck et al. ........... 260/45.5 |
| 3,150,209 | A | 9/1964 | Short et al. .................. 260/894 |
| 3,265,765 | A | 8/1966 | Holden et al. .............. 260/876 |
| 3,297,667 | A | 1/1967 | Dohlen et al. ............. 260/82.1 |
| 3,322,856 | A | 5/1967 | Holden et al. .............. 260/876 |
| 3,333,024 | A | 7/1967 | Haefele et al. ............. 260/880 |
| 3,496,154 | A | 2/1970 | Wofford .................... 260/84.7 |
| 3,498,960 | A | 3/1970 | Wofford .................... 260/84.7 |
| 3,541,064 | A | 11/1970 | Yoshimoto et al. ........ 260/85.1 |
| 3,595,942 | A | 7/1971 | Wald et al. ................. 260/880 |
| 3,700,633 | A | 10/1972 | Wald et al. ............. 260/880 B |
| 4,028,485 | A | 6/1977 | Poloso et al. .............. 528/486 |
| 4,107,236 | A | 8/1978 | Naylor et al. ............... 260/879 |
| 4,145,298 | A | 3/1979 | Trepka ....................... 252/51.5 |
| 4,238,202 | A | 12/1980 | Trepka et al. .................. 44/62 |
| 4,242,232 | A | 12/1980 | Sylvester et al. ........... 252/429 |
| 4,444,903 | A | 4/1984 | Carbonaro et al. ......... 502/102 |
| 4,461,883 | A | 7/1984 | Takeuchi et al. ............ 526/139 |
| 4,980,331 | A | 12/1990 | Hoxmeier et al. .......... 502/117 |
| 5,030,779 | A | 7/1991 | Hoxmeier et al. .......... 585/262 |
| 5,280,081 | A | 1/1994 | Abraham .................... 525/339 |
| 5,710,219 | A | 1/1998 | Bates et al. ................. 525/240 |
| 5,804,644 | A * | 9/1998 | Nakafutami et al. ........ 524/572 |
| 6,184,320 | B1 | 2/2001 | Starzewski et al. ......... 526/161 |
| 6,255,416 | B1 | 7/2001 | Sone et al. ................. 526/153 |
| 6,391,990 | B1 | 5/2002 | Ishino et al. ................ 526/143 |
| 6,437,205 | B1 | 8/2002 | Miller et al. ................... 585/12 |
| 6,482,906 | B1 | 11/2002 | Tocchetto Pires et al. .. 526/164 |
| 6,482,930 | B1 | 11/2002 | Kwag et al. .................. 534/16 |
| 6,838,526 | B1 | 1/2005 | Sone et al. ............... 525/332.8 |
| 2002/0013436 | A1 | 1/2002 | Suzuki et al. ............... 526/160 |
| 2003/0212220 | A1 | 11/2003 | Laubry ....................... 526/153 |
| 2004/0009870 | A1 | 1/2004 | Laubry ....................... 502/152 |
| 2004/0019171 | A1 | 1/2004 | Laubry ....................... 526/335 |
| 2005/0004333 | A1 | 1/2005 | Laubry ....................... 526/164 |
| 2005/0090383 | A1 | 4/2005 | Thiele et al. ............... 502/152 |

FOREIGN PATENT DOCUMENTS

| EP | 11184 | 5/1983 |
| EP | 0968992 | 1/2000 |
| FR | 1581146 | 9/1969 |
| FR | 2393608 | 1/1979 |
| GB | 1198195 | 7/1970 |
| GB | 1213411 | 11/1970 |

OTHER PUBLICATIONS

Hsieh et al. Advances in Elastomers and Rubber Elasticity, 197-220(1986).*
"Journal of Polymer Science", Part A/1, vol. 9, 2617-2623 (1971), "Coordination Catalysts for the Selective Hydrogenation of Polymeric Unsaturation"; John Carl Falk.
H.L. Hsieh and R. Quirk, "Anionic Polymerization, Principles and Practical Applications," Marcel Dekker Inc., New York, Basel, 1966, pp. 197-235. "Stereochemicstry of Polymerization".
*Hans-Georg Elias, Makromolekule [Macromolecules], vol. 1, Grundlagen [Principles], p. 854-856, Huthig und Wepf-Verlag 1990, 5$^{th}$ edition.
J. Macromol. Science, Reviews Macromol. Chem. Phys., C35(2), 239-285, (1995);Chemical Modification of Polymers: Catalytic Hydrogenation and Related Reactions N.T. McManus and G. L. Rempel.
J. Pol. Sci., Polymer Chem., A30, 397-408 (1992); "An Improved Method for the Diimide Hydro-Genation of Butadiene and Isoprene Containing Polymers"; Stephen F. Hahn.
Macromolecules 1992, 25, 525-529, "Spectroscopic Studies of an Ambient-Pressure Process for The Selective Hydrogentation of Polybutadienes" H>G>M> Edwards, et al.
Hsieh H L et al, "Polymers from Hydrogenated Polydienes Prepared With Neodymium Catalysts," Advances in Elastomers and Rubber Elasticity, XX, XX, 1986, Seiten 197-220, XP008049797, Seite 206, Seite 207, Tabellen 5,6, Seite 203, Seite 211.

* cited by examiner

Primary Examiner—Ling-Sui Choi
(74) Attorney, Agent, or Firm—Nicanor A. Kohncke

(57) ABSTRACT

The random, hydrogenated copolymers according to the present invention of unsubstituted conjugated dienes and substituted conjugated dienes, having a glass transition temperature of $\leq -60°$ C., an enthalpy of fusion of $\leq 100$ J/g and a content of residual double bonds in the range from 0 to 80%, are suitable for the production of rubber moldings of all kinds which have good resistance to ageing and high resilience at low temperatures. In particular, various tire components and industrial rubber articles may be mentioned as rubber moldings. The copolymers are also suitable for the rubber modification of brittle thermoplastics.

20 Claims, No Drawings

HYDROGENATED COPOLYMERS OF UNSUBSTITUTED AND SUBSTITUTED CONJUGATED DIENES

FIELD OF THE INVENTION

The present invention relates to random, hydrogenated copolymers of unsubstituted conjugated dienes and substituted conjugated dienes having low glass transition temperatures and low enthalpies of fusion, which are prepared by hydrogenating corresponding unhydrogenated copolymers. The random, hydrogenated copolymers according to the present invention and containing unsubstituted and substituted dienes are very resistant to ageing and have high resilience, even at low temperatures. They are therefore outstandingly suitable for the production of rubber moldings of all kinds in which good resistance to ageing and good resilience at low temperatures are required. For example, they are y suitable for the production of engine bearings, since, owing to the low glass transition temperatures, they do not harden even under high-frequency stress, for the production of side walls of tires, for which good resistance to ageing in combination with good covulcanization behaviour and high resiliences are required, for tire carcasses, for which good covulcanization behaviour is required in addition to good resistance to ageing, and for the rubber modification of brittle thermoplastics, for which good graftability is important in addition to a low glass transition temperature.

BACKGROUND OF THE INVENTION

It is known that polybutadiene and polyisoprene, butadiene/isoprene block copolymers and random butadiene/isoprene copolymers can be selectively hydrogenated using so-called coordination catalysts. In this context, reference is made to "Journal of Polymer Science", Part A/1, Vol. 9, 2617–2623 (1971). There, it is reported, inter alia, that random copolymers of butadiene and isoprene can be selectively hydrogenated using certain coordination catalysts comprising transition metal salts of 2-ethylhexanoic acid and organoaluminum compounds. In the case of butadiene/isoprene block copolymers, the polybutadiene block is preferably hydrogenated. In this publication, no product properties or physical parameters of the hydrogenated products are described, nor any information given regarding the structure of the polymers. There are also no indications of any technical properties of the products which make them appear suitable for certain intended uses.

SUMMARY OF THE INVENTION

The present invention provides random, hydrogenated copolymers of unsubstituted conjugated dienes and substituted conjugated dienes having low glass transition temperatures and low enthalpies of fusion, which have a defined content of substituted conjugated dienes, which are suitable for the production of solid moldings of all kinds, and which have high resistance to oxygen and ozone and have high resilience at low temperatures. In addition, the polymers obtained should be virtually amorphous so that the hysteresis losses under dynamic load are low and hence the compression set of the vulcanized products produced therefrom is low.

DETAILED DESCRIPTION OF THE INVENTION

The present invention therefore relates to random, hydrogenated copolymers of unsubstituted conjugated dienes and substituted conjugated dienes having a glass transition temperature of $\leq -60°$ C., an enthalpy of fusion of $\leq 100$ J/g and a content of residual double bonds in the range from 0 to 80%.

The copolymers according to the present invention preferably have a glass transition temperature of $\leq -65$C, an enthalpy of fusion of $\leq 75$ J/g and a content of residual double bonds in the range from 1 to 60%.

The Mooney viscosities of the hydrogenated products are in the range from 5 to 200 Mooney units (ML 1+4/100° C.), preferably in the range from 10 to 150 Mooney units.

Butadiene is suitable as an unsubstituted conjugated diene which serves for synthesizing the copolymers according to the invention.

Suitable substituted conjugated dienes include: 2-methylbuta-1,3-diene (isoprene); 2-ethylbuta-1,3-diene; 2,3-dimethylbuta-1,3-diene; penta-1,3-diene; hexa-1,3-diene; hexa-2,4-diene, octa-1,3-diene and 2-phenylbuta-1,3-diene.

2-Methylbuta-1,3-diene (isoprene) is preferred.

Random hydrogenated copolymers of butadiene and isoprene are preferred.

The random copolymers of unsubstituted conjugated dienes and substituted conjugated dienes which are suitable as starting materials for the hydrogenation can be prepared in a known manner by Ziegler-Natta polymerization or by ionic polymerization in solvents suitable for this purpose and with addition of known reagents for establishing the molecular weight, the molecular weight distribution and the microstructure.

Preferably, the Ziegler-Natta polymerization is effected using neodymium-based catalyst systems, neodymium salts of organic acids preferably being used. The neodymium compounds are usually used in combination with aluminum alkyls or aluminum alkyl hydrides and halogen donors. Halogen donors used are preferably aluminum halides and organic halides, such as tert-butyl chloride. Preferably used aluminum alkyls and aluminum alkyl hydrides include trialkylaluminum, triisobutylaluminum and/or diisobutylaluminum hydride.

Such Ziegler-Natta polymerization systems and the polymerization of conjugated dienes themselves are described, for example in U.S. Pat. Nos. 3,297,667, 4,444,903, 4,461,883, 6,255,416, 6,391,990, EP 7027; EP 11184; EP 968992, EP 1055659; EP 1099711, EP 1134233, EP 1162231, EP 5484897, WO 0069928, WO 0238635; WO 0238636; WO 0248218, WO 03048221.

In addition, the random copolymers according to the present invention can also be prepared in a known manner by anionic copolymerization, which, for example, is described in more detail by: H. L. Hsieh and R. Quirk: "Anionic Polymerization, Principles and Practical Applications", Marcel Dekker Inc., New York, Basel, 1966, pages 197–235.

For the person skilled in the art, it is entirely possible to prepare a very wide range of types of random copolymers according to the present invention, for example by the suitable choice of the initiators for the polymerization, of the solvent, of the molecular weight regulator, of the additives and of the polymerization conditions and by the choice of the ratio of unsubstituted conjugated diene to substituted conjugated diene.

The applicability of the Fox relationship to the dependence of the glass transition temperature of the polymer composition is used as a criterion for the random structure of the copolymers according to the present invention (Hans-Georg Elias, Makromoleküle [Macromolecules], Volume 1, Grundlagen [Principles], page 856, Hüthig und Wepf-Verlag 1990, 5th edition).

The hydrogenation of the random copolymers of unsubstituted conjugated dienes and substituted conjugated dienes, which copolymers are prepared by known processes, is effected in a known and customary manner using the catalysts customary for this purpose. For example, metal salts of the 8th subgroup of the Periodic Table of the Elements have proved suitable for this purpose, in particular nickel and cobalt salts, which are used in combination with aluminum alkyls or methylaluminoxane or in combination with lithium alkyls or aluminum alkyls In this context, reference is made, for example, to the following literature references or patent publications: U.S. Pat. No. 3,333,024, 3,700,633, 4,107,236, 3,541,064, 3,595,942, 4,028,485, 3,135,716, 3,150,209, 3,496,154, 3,498,960, 4,145,298, 4,238,202, 3,265,765, 3,322,856, 4,980,331, EP 401897, FR 1581146, FR 2393608, WO 9314130, U.S. Pat. No. 5,030,779, GB 1198195, GB 1213411 and J. Macromol. Science, Reviews Macromol. Chem. Phys., 035(2), 239–285 (1995). In addition, hydrogenation can also be carried out using catalysts based on rhodium compounds and ruthenium compounds. Furthermore, it is possible to use catalysts based on palladium, platinum or iridium, which may also be applied to known supports (J. Macromol. Science, Reviews Macromol. Chem. Phys., 035(2), 239–285 (1995). The hydrogenation is preferably carried out in the presence of Co and Ni salts in combination with aluminum alkyls.

The amount of catalyst used can easily be determined by preliminary experiments and depends on the desired degree of hydrogenation of the polymers, catalyst concentrations of from about 0.2 mmol to 1000 mmol of catalyst per mole of double bond being customary.

The hydrogenation can also be carried out in the absence of a catalyst, using hydrazine derivatives (J. Pol. Sci., Polymer Chem., A30, 397 (1992) and Macromolecules 25, 525 (1992).

The hydrogenation is effected in organic solvents suitable for this purpose, for example in liquid alkanes, cycloalkanes and/or aromatics, preferably in butane, pentane, hexane, cyclohexane, benzene and/or toluene.

The hydrogenation reaction is usually effected at temperatures in the range from about 20 to 175° C., preferably in the range from 40 to 120° C.

The hydrogen pressure in the hydrogenation is from about 5 bar to 500 bar, preferably from 10 to 100 bar, and the hydrogenation times are from about 10 min to at least 4 hours. The hydrogenation conditions are established so that the desired degree of hydrogenation is achieved.

The degree of hydrogenation is from about 20 to 100%, preferably from 40 to 99%, and, depending on the composition of the random, unhydrogenated copolymers, is related to the desired physical properties of the hydrogenated copolymer and the glass transition temperature and enthalpy of fusion associated therewith.

The working-up of the hydrogenated polymers according to the present invention is effected in a customary manner by separating off the hydrogenation catalyst and isolating the polymers by adding corresponding precipitating agents, such as ethanol or isopropyl alcohol, or by stripping with steam. In the working-up, rubber auxiliaries, for example antiageing agents and oils, may also be added to the copolymers obtained, or complexing agents, such as citric acid and polyfunctional amines, may be added in order to reduce possible contamination of the metals from the catalytic reaction.

The preparation of the copolymers according to the present invention can be effected both batchwise and continuously. It is possible to carry out the preparation of the random copolymers and the hydrogenation thereof without having to isolate the random copolymers from the polymer solution before the hydrogenation. Hydrogenation in the same reactor in which the polymerization was carried out is also possible.

It is of course possible to mix the random, hydrogenated copolymers obtained with other rubbers, for example with natural rubbers, and with known synthetic rubbers, such as polybutadiene, stirene/butadiene rubber, butyl rubber, ethylene/propylene rubbers (EPM and EPDM), hydrogenated nitrile rubber, polychloroprene, nitrile rubber, ethylene/vinyl acetate copolymer and chlorinated or chlorosulphonated polyethylene.

The respective mixing ratio of the rubbers with one another can readily be determined by preliminary experiments and depends on the subsequent intended use of the polymers according to the present invention.

The present invention furthermore relates to the use of the hydrogenated polymers according to the invention, having the physical properties described above, for the production of moldings of all kinds, in particular for the production of industrial rubber articles, such as roll coverings, engine bearings, vibration dampers, shoe soles, hoses and belts, and of various tire components, such as side walls of tires, subtreads and tire carcasses. The polymers according to the present invention are also suitable for the modification of brittle thermoplastics, such as polystyrene, stirene/acrylonitrile and 1-methylstirene/acrylonitrile copolymers, and as an additive to heating and lubricating oils.

EXAMPLES

1. Preparation of Random Butadiene/Isoprene Copolymers Using Nd Catalysis

The preparation of the random butadiene/isoprene copolymers was effected in a 1.7 l steel autoclave using the following basic formulation, a preformed neodymium-based catalyst being used for the polymerization:

| | |
|---|---|
| Cyclohexane | 600 g |
| Monomer mixture comprising butadiene and isoprene | 100 g |
| DIBAH | 2.5 mmol/100 g of monomer |
| Preformed neodymium catalyst | 0.25 mmol/100 g of monomer |

The preforming of the neodymium catalyst was effected under argon in a Schlenk vessel at a concentration of 0.1 M (based on neodymium) in cyclohexane. For the preforming, the individual catalyst components were combined in the following order at room temperature: cyclohexane, diisobutylaluminum hydride, neodymium versatate and ethylaluminum sesquichloride (molar ratios: $n_{DIBAH}/n_{Nd}/n_{Cl}$=10:1:2). Before the use of the preformed catalyst, the latter was stored at room temperature (1–3 days). At the start of the polymerization, the preformed catalyst was added at 60° C. to the solution of the monomers in cyclohexane, the solution containing diisobutylaluminum hydride as a scavenger (molar ratio: $n_{DIBAH}/n_{Nd}$=10/1). The polymerizations were stopped in each case after 2 h at 60° C.

In the cases where the copolymer obtained was isolated before carrying out the hydrogenation, the polymerization reaction was stopped by adding 70 ml of 2.5% strength solution of 2,2'-methylenebis(4-methyl-6-tert-butyl)phenol (BKF) and the polymer was isolated from the solution by coagulation with ethanol and dried at 50° C. in a vacuum drying oven to constant weight.

The glass transition temperatures and the enthalpies of fusion were determined by means of DSC (differential scanning calorimetry) (calorimeter: Pyris DSC-7 from Perkin-Elmer). For this purpose, 11.6±0.3 mg of substance were weighed into standard capsules. In each case two heating steps of in each case −100° C. to +150° C. were carried out at a heating rate of 20 K/min and a cooling rate of 20 K/min while flushing with nitrogen. The glass transition temperatures (Tg) and enthalpies of fusion (ΔH) stated below were determined in each case in the 2nd DSC heating step.

TABLE 1

Rubbers prepared by means of neodymium catalysis (polybutadiene, polyisoprene and random butadiene/isoprene copolymers)

| No. | Butadiene [% by wt.] | Isoprene [% by wt.] | Catalyst [mmol/100 g mon.] | Isoprene content of the copolymer[a] [% by wt.] | ΔH[b] [J/g] | Tg[c] [° C.] | Tg$_{calc}$[d] [° C.] |
|---|---|---|---|---|---|---|---|
| 1 | 100 | 0 | 0.25 | 0 | 0 | −112 | −112 |
| 2 | 75 | 25 | 0.25 | 25.5 | 0 | −104 | −103.0 |
| 3 | 70 | 30 | 0.25 | 28.9 | 0 | −102 | −101.8 |
| 4 | 70 | 30 | 0.25 | 30.9 | 0 | −100 | −99 |
| 5 | 60 | 40 | 0.25 | 40.0 | 0 | −97 | −97.5 |
| 6 | 50 | 50 | 0.25 | 48.0 | 0 | −94 | −94.2 |
| 7 | 10 | 90 | 0.25 | 88.3 | 0 | −74.5 | −76 |
| 8 | 0 | 100 | 0.25 | 100 | 0 | −70 | −70 |

[a] Isoprene contents determined by $^1$H-NMR
[b] Enthalpies of fusion (ΔH) determined by means of DSC
[c] Glass transition temperatures (Tg) determined by means of DSC
[d] Glass transition temperatures (Tg$_{calc}$) calculated with the aid of the Fox equation: $1/Tg_{calc} = w_1/Tg_1 + w_2/Tg_2$, where the following glass transition temperatures were used for the two homopolymers polyisoprene (IR) and polybutadiene (BR): $Tg_{BR} = -112°$ C. and $Tg_{IR} = -70°$ C.

Table 1) shows that the butadiene/isoprene copolymers prepared by means of neodymium catalysis are amorphous (ΔH=0) and that the dependence of the glass transition temperatures on the copolymer composition can be described with the aid of the Fox equation, i.e. the butadiene/isoprene copolymers have a random structure.

2. Hydrogenation of the Random Butadiene Copolymers Based on Nd Catalysis

The hydrogenation of the random butadiene/isoprene copolymers was carried out using a preformed catalyst based on Ni octanoate [Ni(Oct)$_2$] and triethylaluminum [TEA] (Polymer Preprints 2000, 4 (2), 1525). The preforming of these two catalyst components was effected under argon in a Schlenk vessel, TEA in cyclohexane being initially introduced and Ni(Oct)$_2$ being added dropwise as a solution in cyclohexane. The molar TEA/Ni(Oct)$_2$ ratio was kept constant (Al:Ni=3.3:1).

For the hydrogenation, 0.3 mol of the preformed Ni catalyst was used in each case per 100 mol of double bonds.

For the hydrogenation, in each case 30 g of polymer, dissolved in 700 ml of cyclohexane, were initially introduced into a steel autoclave. Before the hydrogenation, 200 ml of cyclohexane were distilled off. The preformed hydrogenation catalyst was then added as a dispersion in cyclohexane, and hydrogen was forced in. The hydrogenation was effected at 50° C. at a hydrogen pressure of from 5 to 6.5 bar. The (partly) hydrogenated copolymer samples were dissolved in toluene, citric acid (0.5 ml of a 6% strength solution of citric acid in ethanol) was added and the extraction was effected with 300 ml of water while passing through air. The (partly) hydrogenated samples were coagulated in an ethanol:water mixture (ethanol:water=10:1) and dried in a drying oven at 50° C. in vacuo.

The glass transition temperatures and enthalpies of fusion of hydrogenated products are listed in Tables 2)–7), the random butadiene/isoprene copolymer having been isolated from the solution after the polymerization in these experiments (no in situ hydrogenation).

TABLE 2

Properties of hydrogenated butadiene/isoprene copolymers comprising 25.5% by weight of isoprene

| Experiment No. | Degree of hydrogenation[a] [%] | Tg[b] [° C.] | Tg[c] [° C.] | ΔH[d] J/g |
|---|---|---|---|---|
| 2.1 | 22 | −104 | −102 | 10 |
| 2.2 | 33 | −104 | −100 | 20 |
| 2.3 | 44 | −104 | −95.5 | 40 |
| 2.4 | 58 | −104 | −79 | 51 |
| 2.5* | 90 | −104 | n.a. | 110 |
| 2.6* | 100 | −104 | n.a. | 106 |

*Examples not according to the invention
[a] Degree of hydrogenation determined by means of $^1$H-NMR
[b] Glass transition temperatures of the copolymers before the hydrogenation
[c] Glass transition temperatures of the hydrogenated copolymers
[d] Enthalpies of fusion of the hydrogenated copolymers

TABLE 3

Properties of hydrogenated butadiene/isoprene copolymers comprising 28.9% by weight of isoprene

| Experiment No. | Degree of hydrogenation[a] [%] | Tg[b] [° C.] | Tg[c] [° C.] | ΔH[d] J/g |
|---|---|---|---|---|
| 3.1 | 35 | −102 | −98.5 | 16.1 |
| 3.2 | 50 | −102 | −82.5 | 45.5 |
| 3.3* | 100 | −102 | −48 | 64.3 |

*Example not according to the invention
[a] Degree of hydrogenation determined by means of $^1$H-NMR
[b] Glass transition temperatures of the copolymers before the hydrogenation
[c] Glass transition temperatures of the hydrogenated copolymers
[d] Enthalpies of fusion of the hydrogenated copolymers

TABLE 4

Properties of hydrogenated butadiene/isoprene copolymers comprising 30.9% by weight of isoprene

| Experiment No. | Degree of hydrogenation[a] [%] | Tg[b] [° C.] | Tg[c] [° C.] | ΔH[d] J/g |
|---|---|---|---|---|
| 4.1 | 21.1 | −100 | −97.5 | 0 |
| 4.2 | 26.3 | −100 | −96 | 0 |
| 4.3 | 31.6 | −100 | −94 | 0 |
| 4.4 | 42.1 | −100 | −91 | 3 |
| 4.5 | 47.4 | −100 | −89.5 | 23 |
| 4.6 | 57.9 | −100 | −84 | 33 |
| 4.7 | 73.7 | −100 | −69.5 | 56 |

[a] Degree of hydrogenation determined by means of $^1$H-NMR
[b] Glass transition temperatures of the copolymers before the hydrogenation
[c] Glass transition temperatures of the hydrogenated copolymers
[d] Enthalpies of fusion of the hydrogenated copolymers

TABLE 5

Properties of hydrogenated butadiene/isoprene copolymers comprising 40% by weight of isoprene

| Experiment No. | Degree of hydrogenation[a] [%] | Tg[b] [° C.] | Tg[c] [° C.] | ΔH[d] J/g |
|---|---|---|---|---|
| 5.1 | 30 | −97 | −84.5 | 17.5 |
| 5.2 | 45 | −97 | −82.5 | 31.5 |
| 5.3 | 55 | −97 | −80.5 | 31.5 |
| 5.4 | 60 | −97 | −76 | 23 |
| 5.5 | 65 | −97 | −72.5 | 24 |
| 5.6 | 75 | −97 | −69.5 | 31.5 |
| 5.7 | 83 | −97 | −67.5 | 32.5 |
| 5.8 | 100 | −97 | −65.5 | 34 |

[a] Degree of hydrogenation determined by means of $^1$H-NMR
[b] Glass transition temperatures of the copolymers before the hydrogenation
[c] Glass transition temperatures of the hydrogenated copolymers
[d] Enthalpies of fusion of the hydrogenated copolymers

TABLE 6

Properties of hydrogenated butadiene/isoprene copolymers comprising 48% by weight of isoprene

| Experiment No. | Degree of hydrogenation[a] [%] | Tg[b] [° C.] | Tg[c] [° C.] | ΔH[d] J/g |
|---|---|---|---|---|
| 6.1 | 25 | −94 | −92.5 | 0 |
| 6.2 | 30 | −94 | −91 | 0 |
| 6.3 | 33 | −94 | −89.5 | 0 |
| 6.4 | 42 | −94 | −86.5 | 2.8 |
| 6.5 | 50 | −94 | −82 | 5.8 |
| 6.6 | 56 | −94 | −77.5 | 20.1 |
| 6.7 | 67 | −94 | −73.5 | 28.2 |
| 6.8 | 83.3 | −94 | −63.5 | 33.5 |
| 6.9 | 100 | −94 | −62 | 34.5 |

[a] Degree of hydrogenation determined by means of $^1$H-NMR
[b] Glass transition temperatures of the copolymers before the hydrogenation
[c] Glass transition temperatures of the hydrogenated copolymers
[d] Enthalpies of fusion of the hydrogenated copolymers

TABLE 7

Properties of hydrogenated butadiene/isoprene copolymers comprising 88.3% by weight of isoprene

| Experiment No. | Degree of hydrogenation[a] [%] | Tg[b] [° C.] | Tg[c] [° C.] | ΔH[d] J/g |
|---|---|---|---|---|
| 7.1 | 29 | −75 | −71.5 | 0 |
| 7.2 | 73 | −75 | −68.5 | 0 |
| 7.3 | 78 | −75 | −66 | 0 |
| 7.4 | 100 | −75 | −65.6 | 0 |

[a] Degree of hydrogenation determined by means of $^1$H-NMR
[b] Glass transition temperatures of the copolymers before the hydrogenation
[c] Glass transition temperatures of the hydrogenated copolymers
[d] Enthalpies of fusion of the hydrogenated copolymers For carrying out the hydrogenation in situ, the butadiene/isoprene copolymers were not isolated from the solvent after completion of the polymerization and the hydrogenation was carried out in the same solvent as the polymerization. In this experiment, the polymerization reaction was stopped with anhydrous ethanol (Aldrich), Al:EtOH ratios of 1:5 and 1:10 being chosen (cf. Table 8). The working-up of the samples and the polymer characterization were effected as described above.

TABLE 8

Properties of hydrogenated butadiene/isoprene copolymers comprising 30% by weight of isoprene (in situ hydrogenation of the same solvent as the polymerization)

| No. | Al:EtOH[e] [molar] | Degree of hydrogenation[a] [%] | Tg[b] [° C.] | Tg[c] [° C.] |
|---|---|---|---|---|
| 8.1 | 1:20 | 40 | −101 | −92.5 |
| 8.2 | 1:10 | 48 | −101 | −86.5 |
| 8.3 | 1:10 | 50 | −101 | −86 |
| 8.4 | 1:10 | 62 | −101 | −77 |
| 8.5 | 1:5 | 60 | −101 | −80 |
| 8.6 | 1:5 | 65 | −101 | −76 |
| 8.7 | 1:5 | 74 | −101 | −72.5 |
| 8.8 | 1:5 | 100 | −101 | −63.8 |

[a] Degree of hydrogenation determined by means of $^1$H-NMR
[b] Glass transition temperatures of the copolymers before the hydrogenation
[c] Glass transition temperatures of the hydrogenated copolymers
[d] Molar Al:EtOH ratio on stopping of the polymerization reaction 3. Preparation of Random Butadiene/Isoprene Copolymers Using Li Catalysis The preparation of the random butadiene/isoprene copolymers by means of n-butyllithium was effected in cyclohexane at 60° C. in a 1.7 l steel autoclave using the following basic formulation:

| | |
|---|---|
| Cyclohexane | 600 g |
| Monomer mixture of butadiene and isoprene | 100 g |
| n-Butyllithium (1.8 M in hexane) | 0.25 mmol/100 g of monomer |

The polymerizations were stopped after 2 h in each case by adding a 2.5% strength solution of 2,2'-methylenebis(4-methyl-6-tert-butyl)phenol (BKF) in ethanol. The working-up of the samples and the sample characterization were effected as in the case of the samples prepared by means of neodymium catalysis.

TABLE 9

Rubbers prepared by means of n-butyllithium catalysis (polybutadiene, polyisoprene and random butadiene/isoprene copolymers)

| No. | Butadiene [% by wt.] | Isoprene [% by wt.] | Isoprene content of the copolymers[a] [% by wt.] | ΔH[b] [J/g] | Tg[c] [° C.] | Tg$_{calc}$[d] [° C.] |
|---|---|---|---|---|---|---|
| 9.1 | 100 | 0 | 0 | 0 | −97.8 | −97.8 |
| 9.2 | 80 | 20 | 22 | 0 | −91.5 | −91.7 |
| 9.3 | 50 | 50 | 46 | 0 | −83.5 | −84.5 |
| 9.4 | 40 | 60 | 57 | 0 | −79.5 | −81.0 |
| 9.5 | 20 | 80 | 83 | 0 | −71.8 | −72.2 |
| 9.6 | 10 | 90 | 90 | 0 | −69 | 69.7 |
| 9.7 | 0 | 100 | 100 | 0 | −65.5 | −66 |

[a] Isoprene contents determined by $^1$H-NMR
[b] Enthalpies of fusion (ΔH) determined by means of DSC
[c] Glass transition temperatures (Tg) determined by means of DSC
[d] Glass transition temperatures (Tg$_{calc}$) calculated with the aid of the Fox equation: $1/Tg_{calc} = w_1/Tg_1 + w_2/Tg_2$, where the following glass transition temperatures were used for the two homopolymers polyisoprene (IR) and polybutadiene (BR): $Tg_{BR} = -97.8°$ C. and $Tg_{IR} = -66°$ C.

Table 9) shows that the butadiene/isoprene copolymers prepared by means of n-butyllithium are amorphous (ΔH=0) and that the dependence of the glass transition temperatures on the copolymer composition can be described with the aid of the Fox equation, i.e. the butadiene/isoprene copolymers have a random structure.

4. Hydrogenation of the Random Butadiene Copolymers on the Basis of a Li Catalyst The hydrogenation and characterization of the butadiene/isoprene copolymers prepared with the aid of butyllithium were effected as described above in the case of the copolymers prepared by means of neodymium catalysis, 0.2 mol of Ni being used per 100 mol of double bonds.

The results are listed in Tables 10)–14), these experiments having been carried out without the in situ technique, i.e. the random butadiene/isoprene copolymers were isolated from the solution after the polymerization and dissolved again in cyclohexane for the hydrogenation.

TABLE 10

Properties of hydrogenated butadiene/isoprene copolymers comprising 22% by weight of isoprene

| No. | Degree of hydrogenation[a] [%] | $T_g^{b)}$ [° C.] | $T_g^{c)}$ [° C.] | $\Delta H^{d)}$ J/g |
|---|---|---|---|---|
| 10.1 | 21.7 | −91.5 | −91 | 7.9 |
| 10.2 | 33.7 | −91.5 | −90 | 15.9 |
| 10.3 | 43.5 | −91.5 | −88 | 28.8 |
| 10.4 | 54.4 | −91.5 | −84 | 45.2 |
| 10.5 | 69.6 | −91.5 | −73 | 42.2 |
| 10.6* | 80.2 | −91.5 | −59.5 | 57.8 |
| 10.7* | 92.9 | −91.5 | −45.5 | 64.1 |
| 10.8* | 100 | −91.5 | −39 | 65.9 |

*Examples not according to the invention
[a] Degree of hydrogenation determined by means of $^1$H-NMR
[b] Glass transition temperatures of the copolymers before the hydrogenation
[c] Glass transition temperatures of the hydrogenated copolymers
[d] Enthalpies of fusion of the hydrogenated copolymers

TABLE 11

Properties of hydrogenated butadiene/isoprene copolymers comprising 46% by weight of isoprene

| No. | Degree of hydrogenation[a] [%] | $T_g^{b)}$ [° C.] | $T_g^{c)}$ [° C.] | $\Delta H^{d)}$ J/g |
|---|---|---|---|---|
| 11.1 | 24 | −83.5 | −82.5 | 0 |
| 11.2 | 34.6 | −83.5 | −81 | 3.5 |
| 11.3 | 43.8 | −83.5 | −79 | 12 |
| 11.4 | 54.8 | −83.5 | −75 | 20.6 |
| 11.5 | 63.5 | −83.5 | −71.5 | 34.1 |
| 11.6 | 76.9 | −83.5 | −68.5 | 45.6 |
| 11.7 | 91.3 | −83.5 | −65.5 | 46.4 |
| 11.8* | 100 | −83.5 | −57.5 | 41.7 |

*Example not according to the invention
[a] Degree of hydrogenation determined by means of $^1$H-NMR
[b] Glass transition temperatures of the copolymers before the hydrogenation
[c] Glass transition temperatures of the hydrogenated copolymers
[d] Enthalpies of fusion of the hydrogenated copolymers

TABLE 12

Properties of hydrogenated butadiene/isoprene copolymers comprising 57% by weight of isoprene

| No. | Degree of hydrogenation[a] [%] | $T_g^{b)}$ [° C.] | $T_g^{c)}$ [° C.] | $\Delta H^{d)}$ J/g |
|---|---|---|---|---|
| 12.1 | 20 | −79.5 | −78.5 | 0 |
| 12.2 | 23.8 | −79.5 | −77.5 | 0 |
| 12.3 | 33.3 | −79.5 | −76.5 | 8.9 |
| 12.4 | 42.9 | −79.5 | −73.5 | 12.6 |
| 12.5 | 55.3 | −79.5 | −71 | 15.9 |
| 12.6 | 67.9 | −79.5 | −68.5 | 27.2 |
| 12.7 | 82.7 | −79.5 | −66 | 38.7 |
| 12.7 | 100 | −79.5 | −64.5 | 34 |

[a] Degree of hydrogenation determined by means of $^1$H-NMR
[b] Glass transition temperatures of the copolymers before the hydrogenation
[c] Glass transition temperatures of the hydrogenated copolymers
[d] Enthalpies of fusion of the hydrogenated copolymers

TABLE 13

Properties of hydrogenated butadiene/isoprene copolymers comprising 83% by weight of isoprene

| No. | Degree of hydrogenation[a] [%] | $T_g^{b)}$ [° C.] | $T_g^{c)}$ [° C.] | $\Delta H^{d)}$ J/g |
|---|---|---|---|---|
| 13.1 | 25 | −71.8 | −67.5 | 0 |
| 13.2 | 34.7 | −71.8 | −66.5 | 0 |
| 13.3 | 44.4 | −71.8 | −66.5 | 0 |
| 13.4 | 58 | −71.8 | −66 | 0 |
| 13.5 | 63 | −71.8 | −65.5 | 0 |
| 13.6 | 76.4 | −71.8 | −64.5 | 0 |
| 13.7 | 81.9 | −71.8 | −65 | 0 |
| 13.8 | 90.6 | −71.8 | −64.5 | 0 |

[a] Degree of hydrogenation determined by means of $^1$H-NMR
[b] Glass transition temperatures of the copolymers before the hydrogenation
[c] Glass transition temperatures of the hydrogenated copolymers
[d] Enthalpies of fusion of the hydrogenated copolymers

TABLE 14

Properties of hydrogenated butadiene/isoprene copolymers comprising 90% by weight of isoprene

| No. | Degree of hydrogenation[a] [%] | $T_g^{b)}$ [° C.] | $T_g^{c)}$ [° C.] | $\Delta H^{d)}$ J/g |
|---|---|---|---|---|
| 14.1 | 19.4 | −69 | −66 | 0 |
| 14.2 | 25 | −69 | −66 | 0 |
| 14.3 | 37.5 | −69 | −65 | 0 |
| 14.4 | 50 | −69 | −64 | 0 |
| 14.5 | 61.1 | −69 | −63.5 | 0 |
| 14.6 | 72.2 | −69 | −63.5 | 0 |
| 14.7 | 100 | −69 | −62.5 | 0 |

[a] Degree of hydrogenation determined by means of $^1$H-NMR
[b] Glass transition temperatures of the copolymers before the hydrogenation
[c] Glass transition temperatures of the hydrogenated copolymers
[d] Enthalpies of fusion of the hydrogenated copolymers For carrying out the hydrogenation in situ, butadiene/isoprene copolymer was not isolated from the solvent after the end of the polymerization and the hydrogenation was carried out directly after the polymerization in the same solvent and in the same reactor as the polymerization. In this experiment, the polymerization reaction was stopped with anhydrous ethanol (Aldrich), an Al:EtOH ratio of 1:5 having been selected (cf. table 15). The hydrogenation, the working-up of the samples and the polymer characterization were carried out as described above.

TABLE 15

Properties of the hydrogenated butadiene/isoprene copolymer comprising 30% by weight of isoprene, in the preparation of which the in situ technology was used

| No. | Al:EtOH[d] [molar] | Degree of hydrogenation[a] [%] | Tg[b] [° C.] | ΔH[c] [° C.] |
|---|---|---|---|---|
| 15.1 | 1:5 | 70 | −72.5 | 47.1 |

[a] Degree of hydrogenation determined by means of $^1$H-NMR
[b] Glass transition temperatures of the copolymers before the hydrogenation
[c] Enthalpies of fusion of the hydrogenated copolymer
[d] Molar Al:EtOH ratio on stopping the polymerization reaction Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. A random, hydrogenated copolymer comprising an unsubstituted conjugated diene and a substituted conjugated diene, wherein the random, hydrogenated copolymer has a glass transition temperature of ≦−65° C., an enthalpy of fusion of ≦100 J/g, and a content of residual double bonds in the range from 1 to 60%.

2. The random, hydrogenated copolymer according to claim 1, wherein the unsubstituted conjugated diene is butadiene.

3. The random, hydrogenated copolymer according to claim 1, wherein the substituted conjugated diene is isoprene.

4. The random, hydrogenated copolymer according to claim 1, wherein the enthalpy of fusion is ≦75 J/g.

5. The random, hydrogenated copolymer according to claim 1, wherein the substituted conjugated diene is chosen from 2-ethylbuta-1,3-diene; 2,3-dimethylbuta-1,3diene; penta-1,3-diene; hexa-1,3-diene; hexa-2,4-diene, octa-1,3-diene and 2-phenylbuta-1,3-diene.

6. The random, hydrogenated copolymer according to claim 1, wherein the Mooney viscosity of the random, hydrogenated copolymer is in the range from 5 to 200 Mooney units (ML 1+4/100° C.).

7. The random, hydrogenated copolymer according to claim 1, wherein the Mooney viscosity of the random, hydrogenated copolymer is in the range from 10 to 150 Mooney units (ML 1+4/100° C.).

8. A random, hydrogenated copolymer comprising:
an unsubstituted conjugated diene and a substituted conjugated diene, said random, hydrogenated copolymer synthesized by
copolymerizing monomers of the unsubstituted conjugated diene and the substituted conjugated diene in the presence of a polymerization catalyst system thereby forming a random copolymer having residual double bonds; and
hydrogenating said residual double bonds in the presence of a hydrogenation catalyst system,
said random, hydrogenated copolymer having a glass transition temperature of ≦−65° C., an enthalpy of fusion of ≦100 J/g, and a content of residual double bonds in the range 1 to 60%.

9. The random, hydrogenated copolymer according to claim 8, wherein said polymerization catalyst system comprises a neodymium-based catalyst system.

10. The random, hydrogenated copolymer according to claim 9, wherein said neodymium-based catalyst system comprises at least one neodymium salt of an organic acid.

11. The random, hydrogenated copolymer according to claim 9, wherein the neodymium-based catalyst system is used in combination with an aluminum alkyl or an aluminum alkyl hydride and a halogen donor.

12. The random, hydrogenated copolymer according to claim 11, wherein the halogen donor is tert-butyl chloride.

13. The random, hydrogenated copolymer according to claim 8, wherein said hydrogenation catalyst system comprises at least one metal salt of the 8th subgroup of the Periodic Table of the Elements.

14. The random, hydrogenated copolymer according to claim 13, wherein said metal salt of the 8th subgroup of the Periodic Table of the Elements comprises a nickel salt.

15. The random, hydrogenated copolymer according to claim 13, wherein said metal salt of the 8th subgroup of the Periodic Table of the Elements comprises a cobalt salt.

16. The random, hydrogenated copolymer according to claim 13, wherein said metal salt of the 8th subgroup of the Periodic Table of the Elements is used in combination with aluminum alkyls or lithium alkyls.

17. The random, hydrogenated copolymer according to claim 8, wherein said polymerization catalyst system comprises diisobutylaluminum hydride, neodymium versatate and ethylaluminum sesquichloride and further wherein said hydrogenation catalyst system comprises Nickel octanoate $(Ni(Oct)_2)$.

18. The random, hydrogenated copolymer according to claim 8, wherein said polymerization catalyst system comprises n-butyllithium in solvent other than tetrahydrofuran (THF) and further wherein said hydrogenation catalyst system comprises Nickel octanoate $(Ni(Oct)_2)$.

19. A rubber molding comprising a random, hydrogenated copolymer according to claim 1.

20. A thermoplastic comprising a random, hydrogenated copolymer according to claim 1.

* * * * *